United States Patent [19]

Ackel

[11] 4,081,197
[45] Mar. 28, 1978

[54] FLOOR TUNNEL STRUCTURE FOR MOTOR VEHICLES

[75] Inventor: Sabet Ackel, Stuttgart, Germany

[73] Assignee: Daimler-Benz Aktiengesellschaft, Germany

[21] Appl. No.: 598,229

[22] Filed: Jul. 23, 1975

[30] Foreign Application Priority Data

Jul. 24, 1974 Germany .............................. 2435545

[51] Int. Cl.² ............................................. B62D 21/00
[52] U.S. Cl. ................................... 296/28 R; 85/32 K; 180/64 R; 280/106 R
[58] Field of Search .......................... 296/28 F, 28 R; 280/106 R; 180/64 R; 85/32 K, 32 R

[56] References Cited

U.S. PATENT DOCUMENTS

| 1,909,287 | 5/1933 | Ledwinka | 296/28 R |
| 1,985,272 | 12/1934 | Adams | 85/32 R X |
| 2,118,365 | 5/1938 | Sherman | 280/106 R |
| 2,386,280 | 10/1945 | Ulrich | 296/28 R |
| 3,108,836 | 10/1963 | Deckert | 296/28 F |

FOREIGN PATENT DOCUMENTS 527,340  10/1940  United Kingdom ............. 85/32 K

Primary Examiner—Joseph F. Peters, Jr.
Assistant Examiner—Milton L. Smith
Attorney, Agent, or Firm—Craig & Antonelli

[57] ABSTRACT

A tunnel structure arranged in the center of the floor of a passenger motor vehicle, which extends in the longitudinal direction and in which a hollow bearer is formed by tunnel edge reinforcements; at least one traverse extending over the open tunnel side and supporting drive unit parts is adapted to be threadably connected to the parallel flanges of the two tunnel edge reinforcements while bolt holes and insert openings coordinated to the bolt holes are provided in the reinforcing member at different longitudinal positions for movable connecting bolts.

16 Claims, 7 Drawing Figures

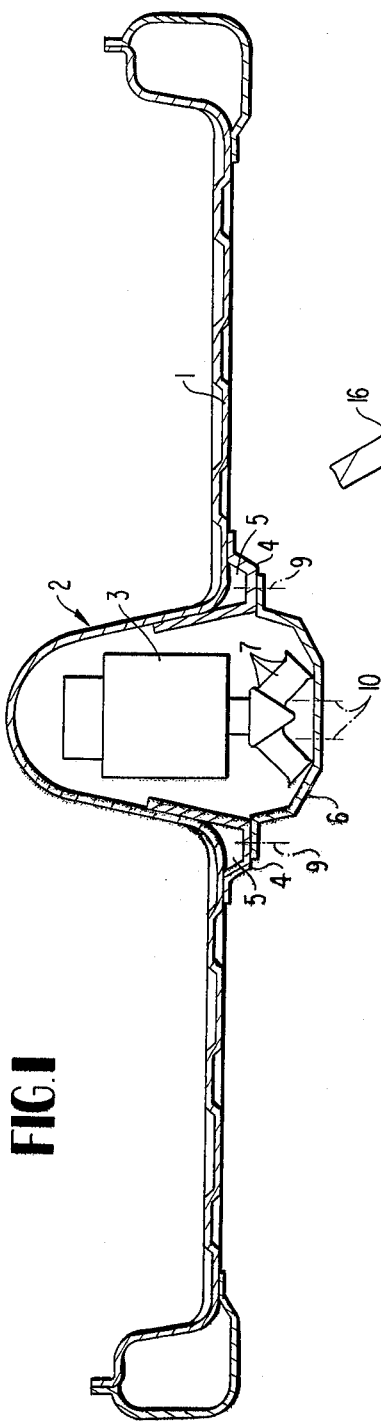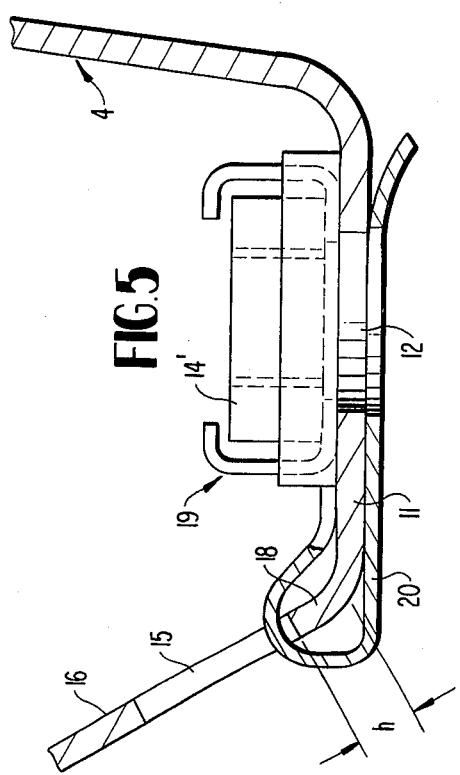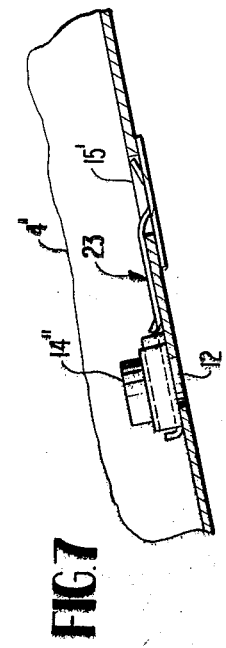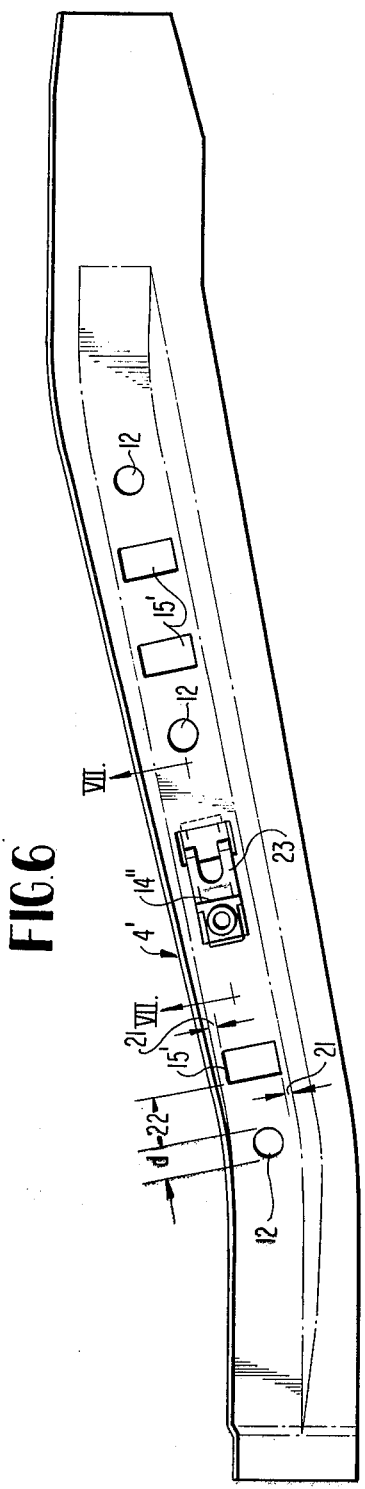

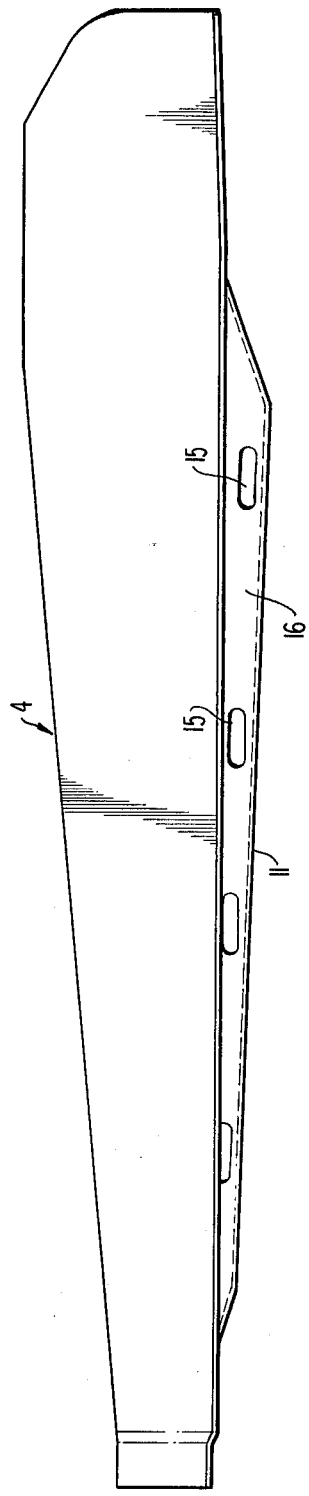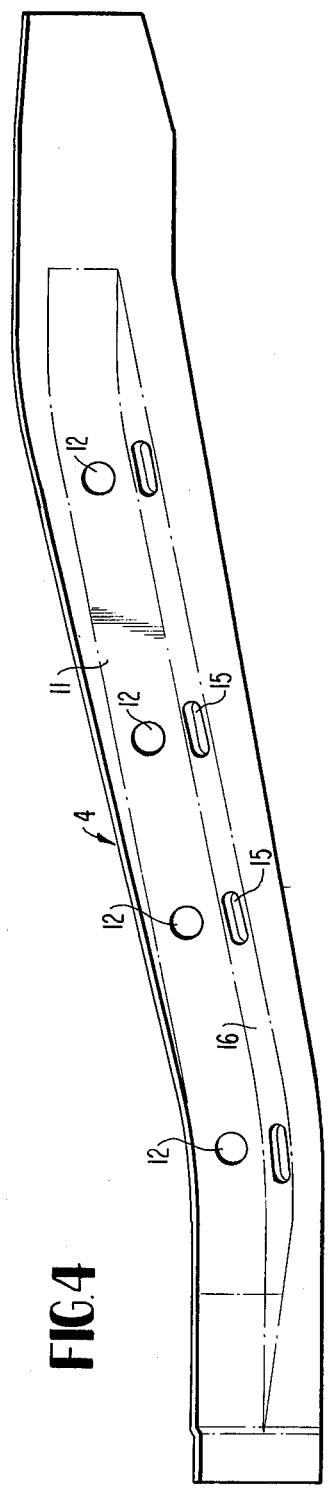

FLOOR TUNNEL STRUCTURE FOR MOTOR VEHICLES

The present invention relates to a tunnel structure for accommodating drive unit parts, arranged in the floor center of a passenger motor vehicle and extending in the vehicle longitudinal direction. The tunnel structure includes a pair of lower tunnel rim edges. Within the area of each tunnel rim edge a closed hollow bearer (tunnel edge reinforcement) formed on the floor or tunnel sheet metal member and of a preferably thicker reinforcing sheet metal member, is provided whereby the hollow bearer member includes one outwardly disposed wall section each at the reinforcing sheet metal member (parallel flange) which—as viewed in the driving direction—extends at least approximately rectilinearly and parallel to the floor plane.

Such a floor construction is described, for example, in the German Offenlegungsschrift No. 1,655,978. The open longitudinal side of the tunnel is traversed or bridged by a girder or traverse which reinforces the floor in the transverse direction. Such girders or traverses also have the purpose to support drive unit parts. In order to enable a radial installation of the drive unit parts into the tunnel, such a traverse or girder has to be detachably secured to the vehicle floor. The tunnel edge reinforcement, however, must not be significantly weakened.

This is so as it has been discovered that on the basis of such a tunnel edge reinforcement the tunnel itself and the adjoining floor sheet metal members can be manufactured in a manner favorable as regards manufacture of a continuous thin sheet metal member without loss in rigidity and strength; the tunnel edge reinforcement imparts to the floor structure the longitudinal rigidity necessary for safety reasons.

It is the aim of the present invention to mount a traverse or girder, which does not impair the ability to assemble and install drive unit parts, in such a manner that drive unit parts of differing lengths are adapted to be installed in a cost-saving manner and without apertures or perforations in the floor covering panels. The underlying problems are solved according to the present invention in that at least one traverse or girder extending over the open tunnel side and supporting drive unit parts is adapted to be threadably connected to the parallel flanges of the two tunnel edge reinforcements at different longitudinal positions and in that bolt holes are provided on different positions on the parallel flanges and insert openings, coordinated to the bolt holes, are provided in the reinforcing sheet metal member for movable nuts.

The traverse or girder is therefore threadably connected according to the present invention to the hollow bearer of the tunnel edge reinforcement. Owing to the threaded connection of the traverse or girder, a radial assembly or installation of the drive unit parts is possible; by reason of the differing threaded connectability, all possible types of drive units—namely four-, six- or eight-cylinder engines, four-speed, five-speed or automatic transmissions flangedly connected—are adapted to be supported by means of the traverse or girder. The movable nuts form the threaded connection inexpensively since the nuts are inserted only at the actually required threaded connecting places, thereby avoiding costly blind nuts and avoiding the use of non-detachable welded-on nuts. The avoidance of welded-on nuts is significant since one always has to reckon with the fact that with welded-on nuts or with welded-on cage-nuts, if a thread has been omitted, is damaged or becomes damaged during assembly of the threaded connection, especially, as welded-on nuts have lacquered threads, the traverse or girder can then be assembled only after a very complicated and time-consuming nut exchange, involving the steps of opening the hollow bearer by chisel, removal of the nut by chisel, manual welding-on the new nut, welding together the hollow bearer, and lacquering and masking the repair place, which inherently involves a fire danger. Owing to the threaded connection of the traverse or girder to the hollow bearer and of the nut insert opening in the reinforcing sheet metal member, the floor sheet metal member is undamaged, and complicated sealing operations can be economized.

In order that the shear strength of the hollow bearer of the edge reinforcement is not unnecessarily impaired, it is appropriate if the edges of apertures in the reinforcing sheet metal member, especially the edges of nut insert openings have a predetermined spacing (an edge web) from a profile edge of the tunnel edge reinforcement, and more particularly, preferably corresponding at least to about 1½ times the thickness of the reinforcing sheet metal member. It also serves the preservation of the bearer strength if the insert openings are arranged on the side of the tunnel edge reinforcement opposite the tunnel interior. In lieu thereof, the insert openings, however, may also be arranged in the parallel flange with a spacing from the bolt holes corresponding at least to approximately twice the diameter of the bolt holes; the bearer strength is also only insignificantly impaired thereby.

For purposes of facilitating the insertion of the nut into the interior of the hollow bearer and for purposes of holding the nut during tightening of the threaded connection, a holding lug or bar extending outwardly out of the interior of the tunnel edge reinforcement through the insert opening and non-rotatably connected with the nut may be arranged at each nut. This would then constitute an effective and particularly inexpensive insert nut which, however, would have to be held fast during the insertion of the bolt. In order to avoid the need for manually holding fast such nut—for the most part one hand is required for holding fast the traverse or girder—each nut may also be retained or held fast by a cage having at least one clip clasp which is adapted to be clipped onto the outside of the parallel flange of the tunnel edge reinforcement through the insert opening, whereby the clip clasp is sufficiently soft in bending for being slipped over the edge web and has a rounded-off portion engaging over the edge web. With insert openings arranged in the parallel flange, a retaining lug or bar extending up to the insert opening and clamping itself fast at the opening edge which is non-rotatably connected with the nut, preferably at the abutment side of the nut, may be arranged at each nut.

Accordingly, it is an object of the present invention to provide a floor tunnel structure for motor vehicles which avoids by simple means the aforementioned shortcomings and drawbacks encountered in the prior art.

Another object of the present invention resides in a floor tunnel structure with a tunnel edge reinforcement which is not significantly weakened, notwithstanding the fact that it enables the radial installation of drive unit parts.

A further object of the present invention resides in a tunnel structure in which different drive units having different lengths can be assembled in a cost-saving manner without having to pierce floor panels.

Still another object of the present invention resides in a floor structure for motor vehicles in which not only a radial assembly of the drive unit parts is possible but also the same structural parts can be used without change for different models of vehicle engines and/or transmissions.

Another object of the present invention resides in a reinforced floor structure for passenger motor vehicles which is simple in construction yet exhibits an extraordinary high degree of strength.

These and other objects, features and advantages of the present invention will become more apparent from the following description when taken in connection with the accompanying drawing which shows, for purposes of illustration only, two embodiments in accordance with the present invention, and wherein:

FIG. 1 is a transverse cross-sectional view through a vehicle floor in accordance with the present invention, taken at the location of the rear drive-unit suspensions;

FIG. 3 is a side elevational view of the reinforcing sheet metal member in accordance with the present invention, as required for the tunnel edge reinforcement and provided with connecting bolt holes and lateral insert openings for the nuts, FIG. 4 is a plan view of the reinforcing sheet metal member of FIG. 3;

FIG. 5 is a cross-sectional view through a cage nut of the present invention which is adapted to be clipped on, for the rail according to FIGS. 3 and 4 or according to FIG. 2;

FIG. 6 is a plan view of a modified embodiment of a reinforcing rail with a clipped-on nut and having insert openings for the nut which are arranged in the parallel flange in accordance with the present invention; and FIG. 7 is a cross-sectional view through the nut fastening at the rail, taken along line VII—VII of FIG. 6.

Figure 2:
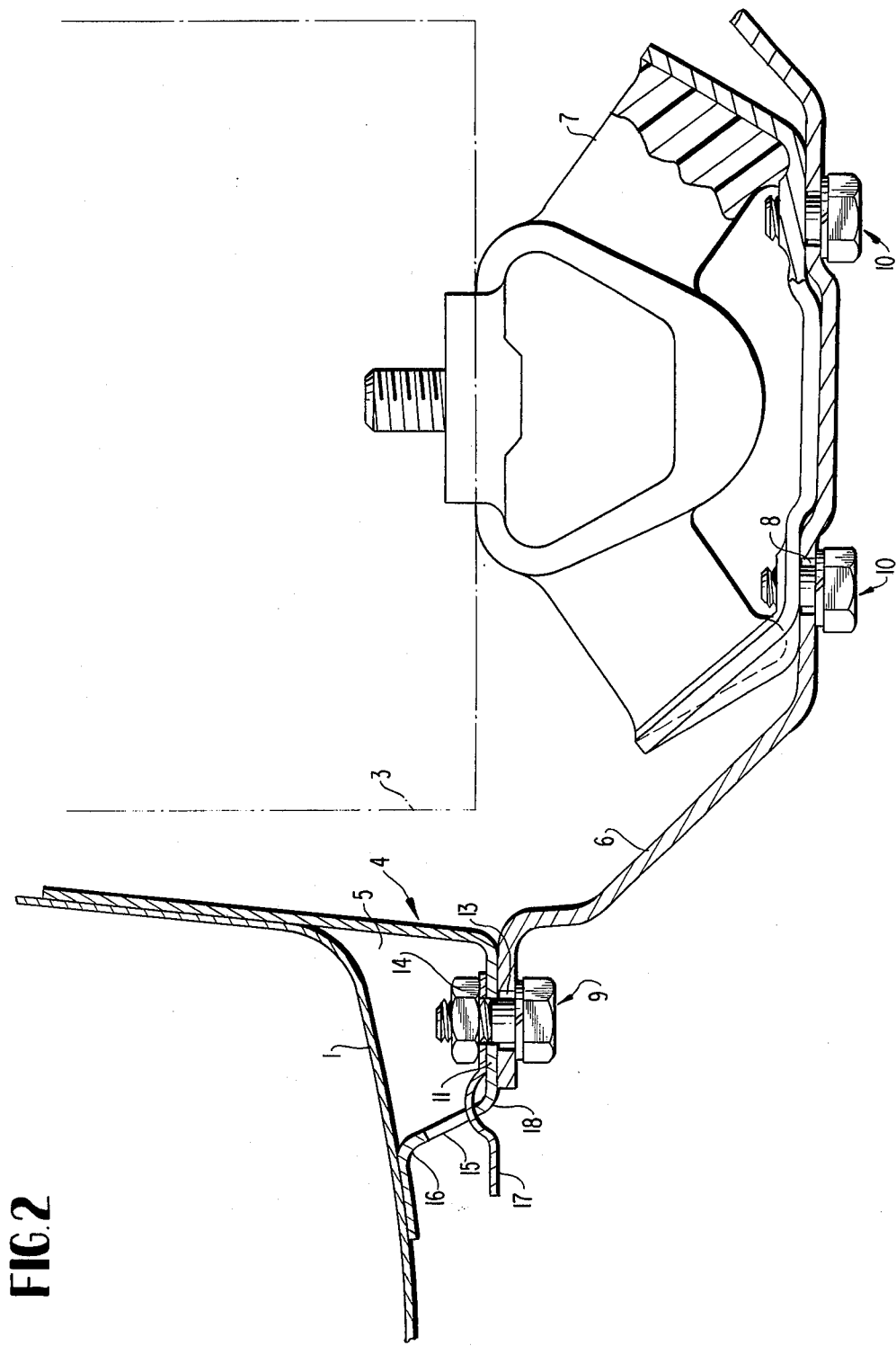
FIG. 2 is a partial cross-sectional view, on an enlarged scale, of a part of the cross-sectional view of FIG. 1.

Referring now to the drawing wherein like reference numerals are used throughout the various views to designate like parts, the vehicle floor illustrated in FIG. 1 includes a sheet metal floor member 1 extending continuously nearly over the entire vehicle width and forming walls of a tunnel generally designated by the reference numeral 2 arranged in a center of the vehicle floor and extending in the vehicle longitudinal direction with the tunnel being open in a downward direction. Such a construction of the vehicle floor member 1 and tunnel 2 is particularly favorable from a manufacturing point of view. Drive unit parts 3 of the vehicle are arranged within the tunnel 2. By reason of the wall of the tunnel 2 being of the same thickness as the other floor portions, the tunnel 2 is not inherently sufficiently stiff or rigid without further measures for the forces occurring in case of a collision in order to impart the necessary formstability to the vehicle passenger space on the floor side. For that reason, sheet metal reinforcing members 4 are mounted on the lower longitudinal edges of the tunnel 2 which, together with the sheet metal floor member 1 form a hollow bearer 5. The hollow bearer 5 includes a wall section 11 (FIG. 2) in the sheet metal reinforcing member 4 disposed parallel to the floor plane—as viewed in the cross sections of FIGS. 1 or 2, i.e., as viewed in the vehicle longitudinal direction—the so-called parallel or connecting flange. The open lower longitudinal side of the tunnel 2 is bridged over by means of a girder or traverse 6 for improving the cross stability of the vehicle floor and for supporting the drive unit parts. The traverse or girder 6 is threadably connected both with the tunnel edge sheet metal reinforcing members 4 by the use of threaded connections generally designated by reference numeral 9 and with the rubber spring elements 7 to be coordinated to the drive unit parts 3 by the use of threaded connections generally designated by reference numeral 10 (FIG. 2). The two threaded connections permit a slight tolerance compensation in the vehicle transverse direction—twice the clearance of the bolts in the threaded bolt holes—and thus enable an assembly of the drive unit parts free of mechanical stresses in the transverse directions, as is required for a vibration-free and noise-free force-transmission. For purposes of a stress-free assembly in the vehicle longitudinal direction, the two center through-holes 8 for the bolts in the traverse or girder 6 (FIG. 2) are constructed as elongated apertures for a large longitudinal compensation. The traverse or girder 6 is adapted to be threadably connected at differing longitudinal positions by reason of several bolt through-holes 12 provided in the parallel flange 11 (FIGS. 3 and 4) so that drive unit parts 3 of differing length are adapted to be supported. The bolt through-holes 13 in the traverses or girders 6 for the threaded edge connection 9 may be arranged therein several times so that the traverse or girder 6 is adapted to be threadably connected at different longitudinal positions to one and the same bolt through-hole 12 of the parallel flange 11. The elongated apertures 8 arranged in the traverse or girder 6 are constructed of such length that at least two possible adjacent longitudinal positions of the girder or traverse 6 can be functionally bridged therewith.

Owing to this construction, a very finely stepped longitudinal positioning of the rubber element 7 at the tunnel edge is possible over a relatively large longitudinal range whereas the sheet metal reinforcing member 4 includes only four weakened places impairing only insignificantly its shearing strength.

The threaded connection 9 of the traverse or girder 6 on the parallel flange 11 is so constructed that the nut 14 to be inserted into the interior of the hollow bearer 5 is movable and readily exchangeable for a tolerance compensation and in a cost-saving manner has to be installed only at the actually required places. The insert openings 15 or 15' for the nuts are so arranged in the hollow bearer 5 that the sheet metal floor member 1 remains undamaged and need not be sealed off. The necessary apertures for the threaded connections the bolt through-holes 12 and insert openings 15 and 15', are so arranged in their number and their arrangement in the sheet metal reinforcing member 4 that the weakening of the shear strength of the hollow bearer 5 is minimal and is acceptable. In the embodiment of the threaded edge connection 9 illustrated in FIGS. 2 and 5, the nut insert opening 15 is arranged laterally of the hollow bearer 5 along the shorter side wall 16 of the sheet metal reinforcing member 4 or of the hollow bearer 5 opposite the inside of the tunnel. Its lower edge has a distance $h$ (FIG. 5) from the adjacent profile edge whereby an edge web 18 remains which imparts sufficient rigidity to the profile edge within the opening area, if it is at least 1¼ times as large as the sheet metal thickness. In the embodiment of the threaded connection illustrated in FIG. 2, the nut 14 is non-rotatably provided, for example, by spot-welded connections, with a holding lug or side bar 17 engaging over the edge web 18, which enables a manual introduction of the nut into the bearer interior and a holding fast of the nut during the threading of the bolt. By reason of a lateral support of the holding lug or side bar 17 at the edge of the insert opening, tightening moments at the nut can be automatically absorbed by the mounting lug 17. The nut 14 which is welded together with a holding lug or bar 17 of simple steel sheet metal, may be manufactured very inexpensively. However, the nut 14' may also be retained according to the embodiment illustrated in FIG. 5 by a cage generally designated by reference numeral 19 and adapted to be clipped-on, which includes a relatively soft clip clasp 20 adapted to be slipped over the edge web 18 and engaging over the edge web 18 in the end position.

According to the further embodiment of the nut insertion and nut relation illustrated in FIGS. 6 and 7, nut insert openings 15' are arranged in the parallel flange 11 itself—leaving a proper edge spacing 21 from the profile edges indicated in dash and dot lines. The spacing 22 (FIG. 6) of the openings from the bolt holes 12 amounts to more than the diameter $d$ thereof. As a result of this construction, the profile is not weakened in a non-permissive manner. The nut 14" which is retained by a retaining lug or bar 23 cage-like yet is movable therein within certain limits is inserted into the interior of the hollow bearer through the rectangularly shaped insert opening 15'. The end of the retaining lug 23 opposite the nut 14" is so constituted and constructed that it is able to clip fast to the edge of the insert opening 15' so as not to be lost. A rotationally safe connection between the nut 14" and the holding lug 23 comes into existence as a result of the cage-like enclosure of the nut 14" by the retaining lug 23 so that after the retaining lug 23 is clipped in at the opening edge 15', the nut 14" is safely retained against rotation within the hollow bearer 5.

While I have shown and described two embodiments in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. A tunnel structure for a floor of a motor vehicle, which includes tunnel edge reinforcing means forming a hollow bearer means along each lower tunnel edge, the tunnel reinforcing means including sheet metal reinforcing members each having parallel flange means, traverse means extending over an open tunnel side and adapted to support drive unit parts, bolt means and nut means for connecting said traverse means to the parallel flange means at different longitudinal positions along the parallel flange means, connecting aperture means for the bolt means of the threaded connection being provided at different longitudinal positions along the parallel flange means, and nut insert aperture means coordinated to the connecting aperture means being provided in the reinforcing means for the connecting nut means of the threaded connection, edges of the nut insert aperture means having a predetermined spacing from a profile edge of the tunnel reinforcing means thereby leaving an edge web with the spacing corresponding at least approximately to 1½ times the thickness of the sheet metal reinforcing members.

2. A tunnel structure according to claim 1, wherein the tunnel structure is arranged essentially in a center of the floor of a passenger motor vehicle and extends essentially in the vehicle longitudinal direction.

3. A tunnel structure according to claim 2, wherein each nut means includes a retaining lug extending up to the insert aperture means which is clampingly secured at an edge of the nut insert aperture means and is non-rotatably connected with the nut means.

4. A tunnel structure according to claim 3, wherein the lug is non-rotatably connected to an abutment side of the nut means.

5. A tunnel structure according to claim 1, wherein the hollow bearer means is formed by a tunnel sheet metal member and by the reinforcing sheet metal member.

6. A tunnel structure according to claim 5, wherein the reinforcing sheet metal member is thicker than the tunnel sheet metal member.

7. A tunnel structure according to claim 6, wherein the tunnel sheet metal member is in one piece with the vehicle floor.

8. A tunnel structure according to claim 1, wherein the nut insert aperture means are arranged on a side of the hollow bearer means opposite the tunnel interior.

9. A tunnel structure according to claim 8, wherein each nut means includes a retaining lug extending outwardly of the interior of the hollow bearer means through the nut insert aperture means and substantially non-rotatably connected with the nut means.

10. A tunnel structure according to claim 8, wherein each nut means is retained by a cage means having at least one clip means, said cage means being adapted to be clipped through the nut insert aperture means to the upper side of the parallel flange means of the hollow bearer means, the clip means being relatively soft in bending for being slipped over the edge web and having a rounded portion engaging over the web.

11. A tunnel structure according to claim 1, wherein each nut means includes a retaining lug extending outwardly of the interior of the hollow bearer means through the nut insert aperture means and substantially non-rotatably connected with the nut means.

12. A tunnel structure according to claim 11, wherein the nut insert aperture means are arranged on a side of the hollow bearer means opposite the tunnel interior.

13. A tunnel structure according to claim 1, wherein each connecting nut means is retained by a cage means having at least one clip means, said cage means being adapted to be clipped through the nut insert aperture means to the upper side of the parallel flange means of the hollow bearer means, the clip means being relatively soft in bending for being slipped over the edge web and having a rounded portion engaging over the edge web.

14. A tunnel structure for a floor of a motor vehicle, which includes tunnel edge reinforcing means forming a hollow bearer means along each lower tunnel edge, the tunnel reinforcing means including parallel flange means, traverse means extending over the open tunnel side and adapted to support drive unit parts, bolt means and nut means for connecting said traverse means to the parallel flange means at different longitudinal positions along the parallel flange means, connecting aperture means for the bolt means of the threaded connection being provided at different longitudinal positions along the parallel flange means, and nut insert aperture means coordinated to the connecting aperture means being provided in the parallel flange means for the connecting nut means of the threaded connection, the insert aperture means in the parallel flange means being arranged with a spacing from the connecting aperture means for the bolt means corresponding at least approximately to twice the diameter of the connecting aperture means.

15. A tunnel structure according to claim 14, wherein each nut means includes a retaining lug extending up to the nut insert aperture means which is clampingly secured at an edge of the nut insert aperture means and is non-rotatably connected with the nut means.

16. A tunnel structure according to claim 15, wherein the lug is non-rotatably connected to an abutment side of the nut means.

* * * * *